United States Patent
Pereira et al.

(10) Patent No.: US 11,736,903 B2
(45) Date of Patent: Aug. 22, 2023

(54) TECHNIQUES FOR REGISTERING AN INTERNET PROTOCOL (IP) ENDPOINT FOR EMERGENCY SERVICES CALLING

(71) Applicant: Bandwidth Inc., Raleigh, NC (US)

(72) Inventors: Daniel Pereira, Bolivia, NC (US); Larry Reeder, Denver, CO (US); Lydia Runnels, Cary, NC (US); Adam Covati, Durham, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 18/118,896

(22) Filed: Mar. 8, 2023

(65) Prior Publication Data

US 2023/0232188 A1    Jul. 20, 2023

Related U.S. Application Data

(63) Continuation of application No. 17/576,368, filed on Jan. 14, 2022, now Pat. No. 11,632,655.

(51) Int. Cl.
| | |
|---|---|
| *H04W 4/029* | (2018.01) |
| *H04W 76/50* | (2018.01) |
| *H04M 7/00* | (2006.01) |
| *H04W 4/20* | (2018.01) |
| *H04W 4/14* | (2009.01) |

(52) U.S. Cl.
CPC ......... *H04W 4/029* (2018.02); *H04M 7/0075* (2013.01); *H04W 4/14* (2013.01); *H04W 4/20* (2013.01); *H04W 76/50* (2018.02)

(58) Field of Classification Search
CPC ......... H04W 4/029; H04W 4/20; H04W 4/14; H04W 76/50; H04M 7/0075
See application file for complete search history.

(56) References Cited

U.S. PATENT DOCUMENTS

| | | | |
|---|---|---|---|
| 9,408,046 B2 * | 8/2016 | Morin | H04W 4/12 |
| 10,667,199 B1 * | 5/2020 | Mitchell, Jr. | H04M 7/0093 |
| 2003/0086539 A1 * | 5/2003 | McCalmont | H04Q 3/72 379/46 |

(Continued)

*Primary Examiner* — William Nealon
(74) *Attorney, Agent, or Firm* — Gregory Stephens

(57) ABSTRACT

Techniques are described for obtaining current location data for a non-traditional telephony endpoint for emergency calling purposes. An emergency services (ES) provider receives, from a telephony server responding to a telecommunication session establishment request from a telephony endpoint, a location registration request, the location registration request including telephony endpoint identification information and a mobile device telephone number. The ES provider may send a short message service (SMS) message to the mobile device telephone number, the SMS message including an executable registration link that when executed on a mobile device receiving the SMS message causes the mobile device to retrieve location data of the mobile device. The ES provider may then receive the current location data from the mobile device and store it and the telephony endpoint identification information for subsequent use should a 911 call be made from that telephony endpoint. The ES provider may then send the telephony server an authorization acknowledgement for the telecommunication session establishment request.

13 Claims, 6 Drawing Sheets

(56) References Cited

U.S. PATENT DOCUMENTS

| | | | | |
|---|---|---|---|---|
| 2007/0058615 | A1* | 3/2007 | Hasenfang | H04M 11/04 |
| | | | | 370/352 |
| 2007/0153986 | A1* | 7/2007 | Bloebaum | H04M 7/006 |
| | | | | 379/221.11 |
| 2008/0125077 | A1* | 5/2008 | Velazquez | H04L 12/66 |
| | | | | 455/404.2 |
| 2012/0264427 | A1* | 10/2012 | Adatia | H04W 4/14 |
| | | | | 455/435.1 |
| 2014/0280981 | A1* | 9/2014 | Singhal | H04L 67/142 |
| | | | | 709/227 |
| 2015/0178750 | A1* | 6/2015 | Robinson | G06Q 30/0261 |
| | | | | 705/7.34 |
| 2016/0073352 | A1* | 3/2016 | Baron | H04B 17/27 |
| | | | | 370/311 |
| 2016/0277476 | A1* | 9/2016 | Pawlik | H04L 67/02 |
| 2018/0197142 | A1* | 7/2018 | Park | G06F 16/22 |
| 2018/0295479 | A1* | 10/2018 | Hassan | H04W 8/005 |
| 2018/0310159 | A1* | 10/2018 | Katz | H04W 4/50 |
| 2021/0006961 | A1* | 1/2021 | King-Berkman | H04W 4/90 |
| 2021/0225474 | A1* | 7/2021 | Baldassare | G16H 20/10 |
| 2022/0014876 | A1* | 1/2022 | Yoo | G08B 21/0492 |
| 2022/0046415 | A1* | 2/2022 | Chiang | H04W 4/023 |

* cited by examiner

100

200

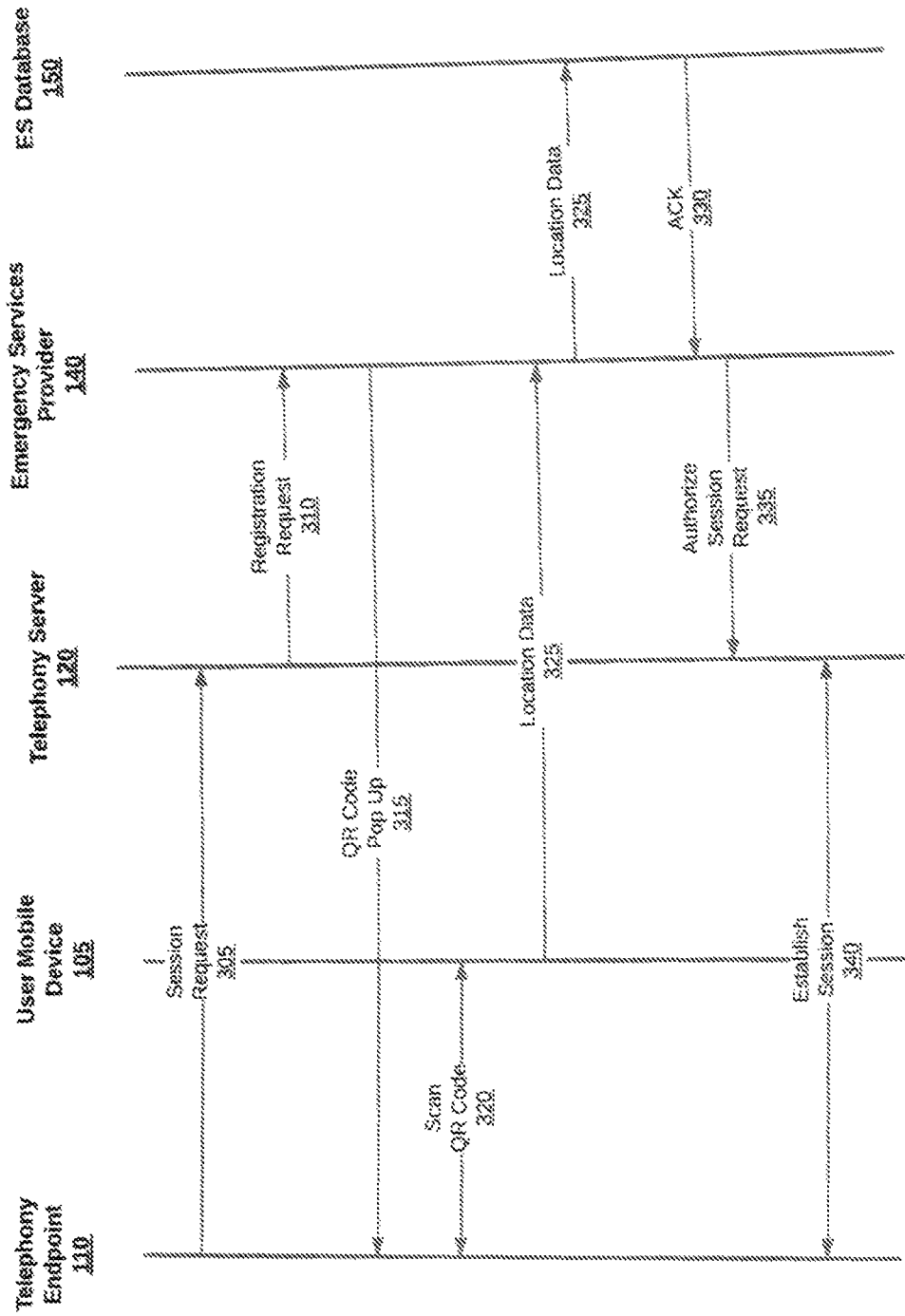

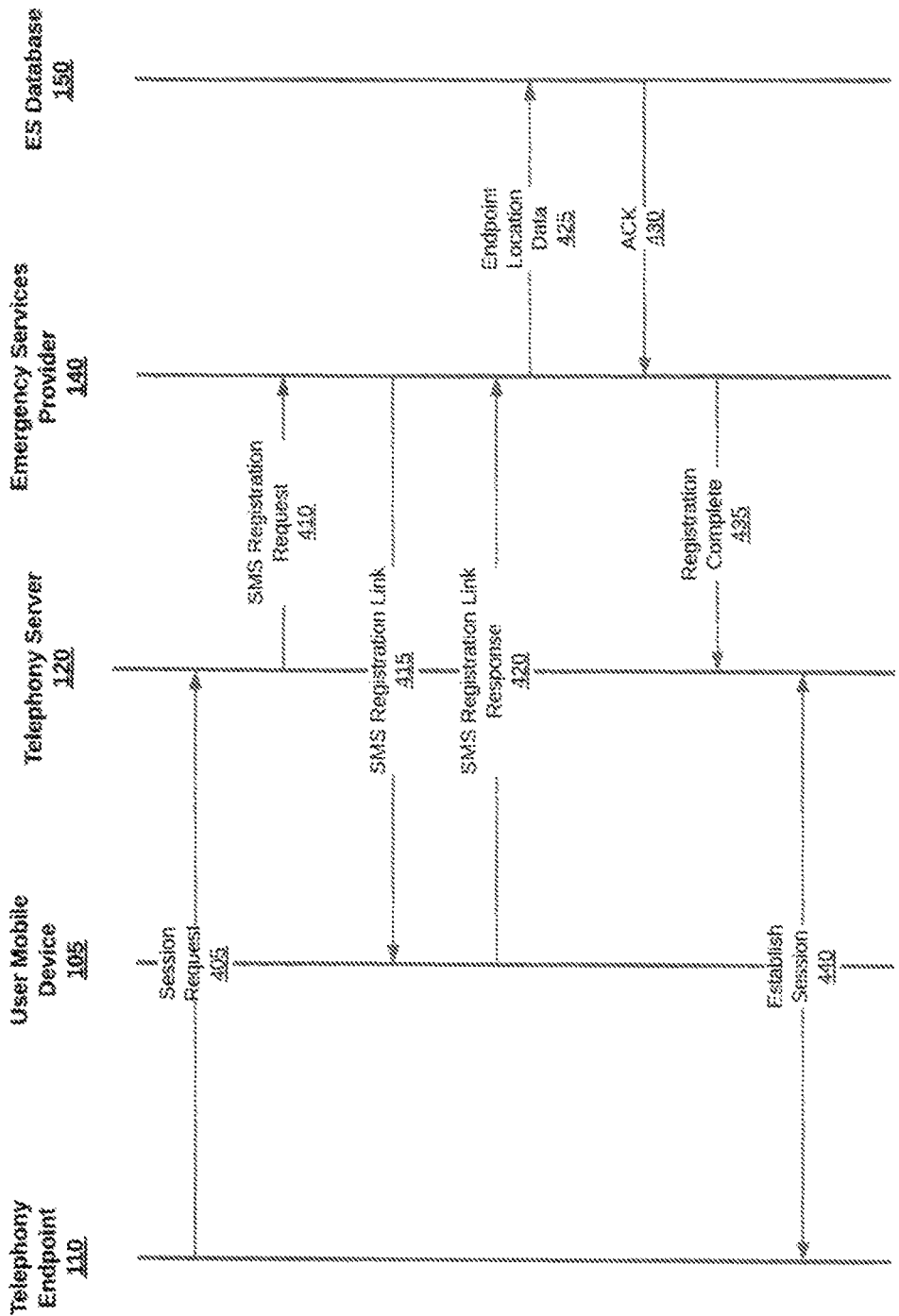

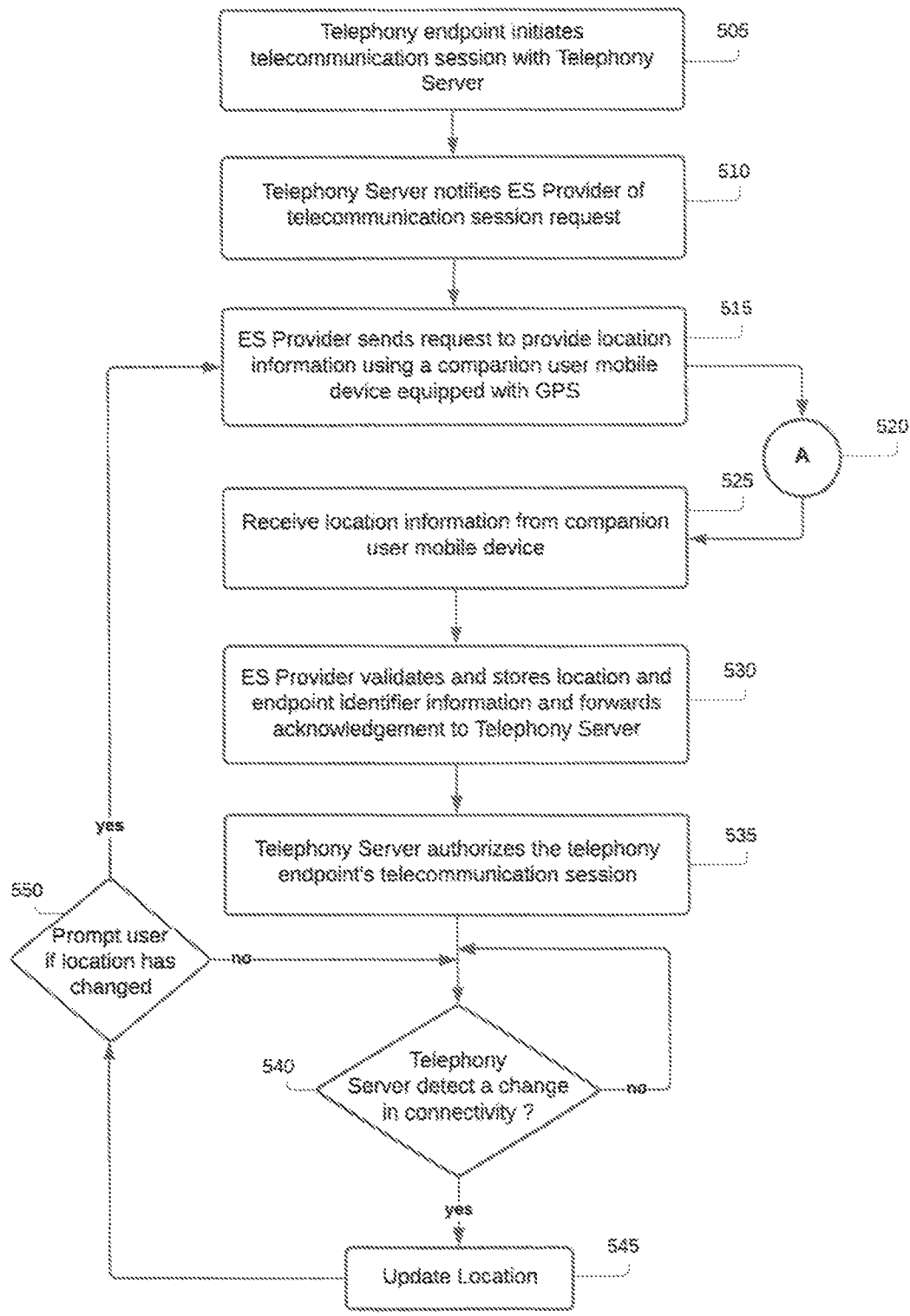

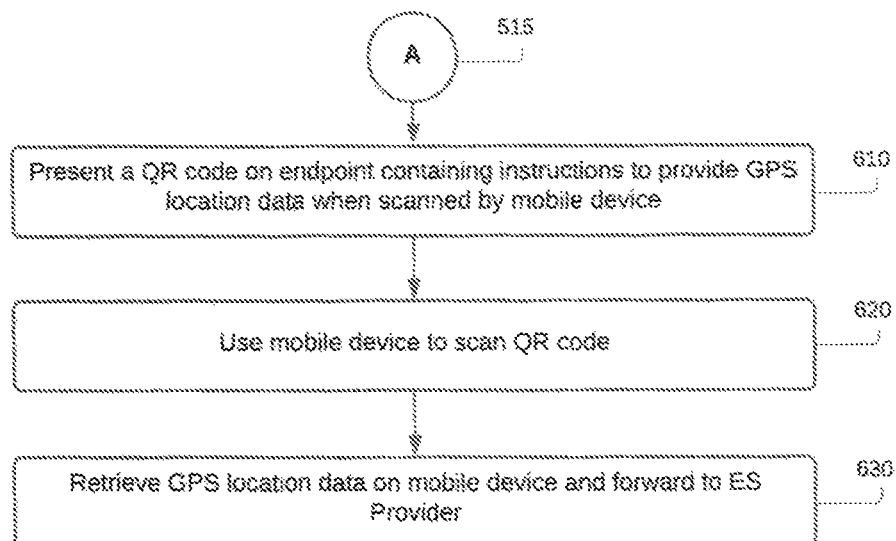
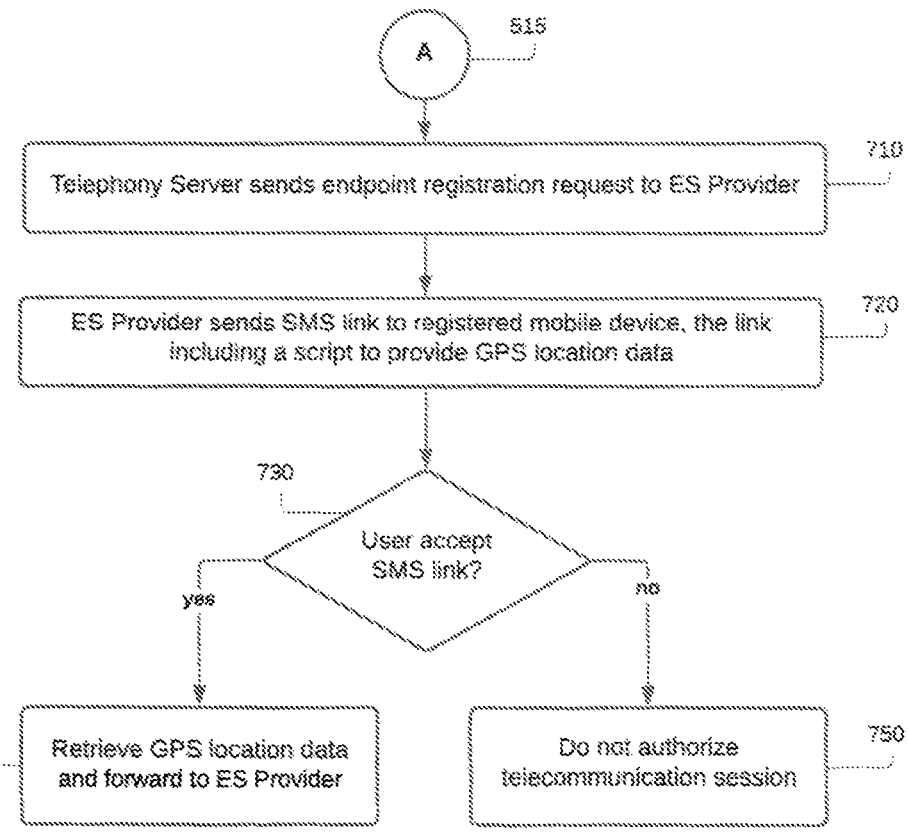

800

Typical 911 Call

TECHNIQUES FOR REGISTERING AN INTERNET PROTOCOL (IP) ENDPOINT FOR EMERGENCY SERVICES CALLING

CROSS-REFERENCE TO RELATED APPLICATIONS

This application is a continuation of and claims the benefit to U.S. Ser. No. 17/576,368 filed on Jan. 14, 2022 entitled "Techniques for Registering an Internet Protocol (IP) Endpoint for Emergency Services Calling".

TECHNICAL FIELD

Examples described herein are generally related to techniques for registering the location of Internet Protocol (IP) endpoints so they can make emergency services (e.g., 911) calls.

BACKGROUND

Emergency calling or 911 as it is known in the United States is a mandated and regulated aspect of telecommunications. End users of interconnected VoIP telephone networks must be able to dial 911 and be connected with a public safety answering point (PSAP) that is the most convenient based on the location of the caller. Emergency service (ES) providers handle 911 calls in a different manner than normal outbound calls. For instance, location data must be determined and used so as to be able to direct the call to the proper PSAP and subsequently relayed to first responders if necessary.

Most VoIP telephone systems keep records of the locations of each endpoint such that when a 911 call is made, the caller's location may be determined and embedded into the signaling of the call thereby allowing the ES provider to route the call to the proper PSAP and present the PSAP with, among other data points, the location data of the caller. Traditional VoIP endpoints typically refer to telephones that have a dedicated telephone number associated with them. Even if the telephone is part of a private branch exchange (PBX) system, it still may be associated with a unique extension that is part of the telephone number. However, there is a class of non-traditional VoIP IP endpoints that may be characterized as softphones that may be integrated into an interconnected VoIP telephony system. A softphone is merely a software application running on a computer device that can make and receive telephone calls as part of a VoIP telephony system. The softphone application is considered a VoIP endpoint but is not necessarily associated with a unique telephone number. Rather, it may be reachable by a VoIP telephony server using an alternate identification means such as, for instance, a session initiation protocol (SIP) universal resource identifier (URI) it is currently associated with. SIP URI is the address scheme for SIP endpoints that identifies the destination or endpoint for SIP traffic.

While a softphone client may dial 911 for an emergency call, there may not be a registered address associated with the endpoint. When the ES server receives the call, it may not have the ability to associate the caller/endpoint with an address and cannot, therefore, determine the proper PSAP to route the call. Nor can it include the current address of the caller. In cases where the ES server cannot determine the proper PSAP, it will default to a national call center. The dispatcher answering the call can hopefully determine the caller's address through conversation and perhaps re-route the call to the proper PSAP. Often, the caller may not be able to quickly or easily provide their location in conversation with the national emergency call center leading to potential delays in providing any needed assistance.

What is needed are techniques to allow an ES provider to dynamically obtain and register an address for a non-traditional IP endpoint when a VoIP telecommunication session is initiated.

SUMMARY

In one embodiment, techniques are described for obtaining current location data for a non-traditional telephony endpoint for emergency calling purposes. An emergency services (ES) provider receives, from a telephony server responding to a telecommunication session establishment request from a telephony endpoint, a location registration request, the location registration request including telephony endpoint identification information. The ES provider may push a quick response (QR) code to the telephony endpoint, the QR code when scanned by a mobile device causes the mobile device to retrieve its current location data. The ES provider may then receive the current location data from the mobile device and store it and the telephony endpoint identification information for subsequent use should a 911 call be made from that telephony endpoint. The ES provider may then send the telephony server an authorization acknowledgement for the telecommunication session establishment request.

In another embodiment, techniques are described for obtaining current location data for a non-traditional telephony endpoint for emergency calling purposes. An emergency services (ES) provider receives, from a telephony server responding to a telecommunication session establishment request from a telephony endpoint, a location registration request, and a mobile telephone number, the location registration request including telephony endpoint identification information. The ES provider may send a short message service (SMS) message containing a registration link to the mobile device telephone number that, when executed, causes a mobile device to retrieve its current location data. The ES provider may then receive the current location data from the mobile device and store it and the telephony endpoint identification information for subsequent use should a 911 call be made from that telephony endpoint. The ES provider may then send the telephony server an authorization acknowledgement for the telecommunication session establishment request.

BRIEF DESCRIPTION OF THE DRAWINGS

FIG. 3 illustrates a first message flow for registering a non-traditional VoIP endpoint for emergency services according to an embodiment.

FIG. 4 illustrates a second message flow for registering a non-traditional VoIP endpoint for emergency services according to an embodiment.

FIG. 5 illustrates a first flowchart for registering a non-traditional VoIP endpoint for emergency services according to an embodiment.

FIG. 6 illustrates a second flowchart for registering a non-traditional VoIP endpoint for emergency services according to an embodiment.

FIG. 7 illustrates a third flowchart for registering a non-traditional VoIP endpoint for emergency services according to an embodiment.

DETAILED DESCRIPTION

Figure 1:
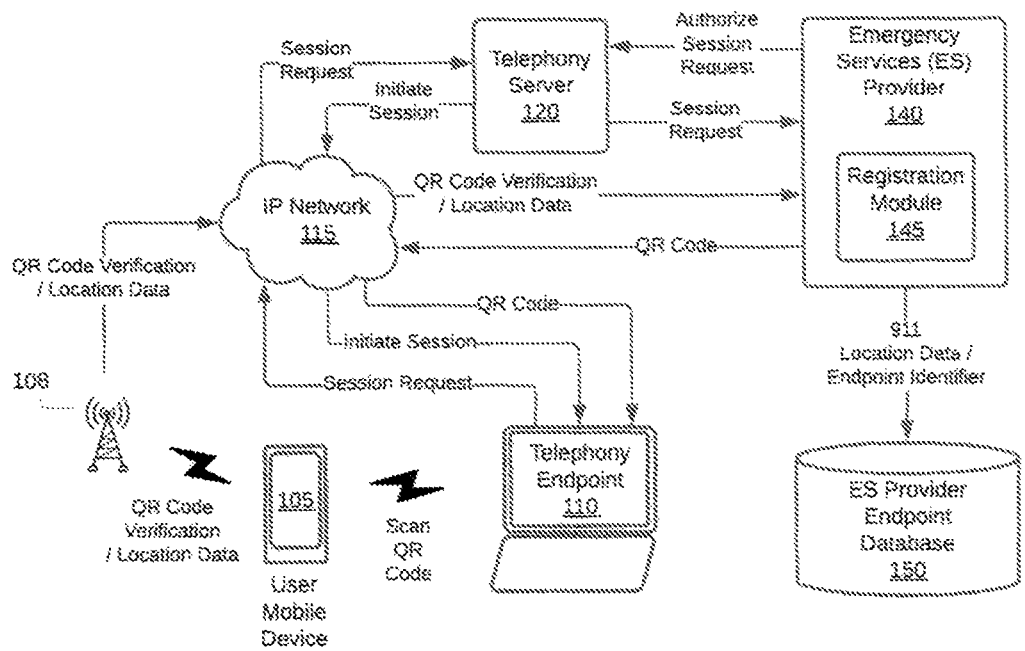
FIG. 1 illustrates a first network architecture for registering a non-traditional VoIP endpoint for emergency services according to an embodiment.

Various embodiments may include a system, method, apparatus, and/or computer program product that describe and claim techniques to register a non-traditional VoIP endpoint for emergency services with an emergency services (ES) provider. In one embodiment, the non-traditional VoIP endpoint may be a softphone client that is part of, for example, a Universal Communications as a Service (UCaaS) system that provides VoIP telephony services through a telephony server to a customer. The customer must provide for emergency services and ensure that any non-traditional VoIP endpoint capable of VoIP telephony can make a 911 call that includes an address for the non-traditional VoIP endpoint.

The techniques described herein utilize a location enabled (e.g., GPS) smartphone that is physically present with the user of a non-traditional VoIP endpoint. When a softphone client (i.e., non-traditional VoIP endpoint) attempts to initiate a session, the telephony server initiates a process to register the location of the non-traditional VoIP endpoint with an ES server. The process involves linking the user's smartphone location based services (e.g., GPS) capability with the VoIP session as described below. The process may result in the sending of the smartphone's location/GPS data to the ES server so that the non-traditional VoIP endpoint may be given a current location that may be used for 911 purposes. The GPS data may be converted to address data and the address may then be verified and formatted into a format acceptable to and usable by a PSAP.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 a first network architecture 100 for registering a non-traditional VoIP endpoint 110 for emergency services using a quick response (QR) code scheme according to an embodiment. The first network architecture 100 illustrates a user mobile device 105 such as a smartphone equipped with a camera and a non-traditional VoIP telephony endpoint 110 such as a laptop executing VoIP capable software. The endpoint 110 is communicable with a telephony server 120 via an IP network 115 (e.g., the Internet). The telephony server 120 is further communicable with an emergency services (ES) telephony provider 140. The ES provider 140 maintains an ES provider endpoint database 150 comprising unique identifiers for each endpoint 110 as well as current location data for such endpoints 110. The aforementioned system elements are configured to work together to register the endpoint 110 within the ES provider endpoint database 150 so that if a 911 emergency call is initiated from the endpoint 110, it can be processed successfully by the ES provider 140.

In one embodiment, this goal may be achieved through use of a QR code that is created by a registration module 145 within ES provider 140 and sent to the telephony endpoint 110 in response to the telephony endpoint 110 requesting a session. A QR code is a two-dimensional version of a barcode able to convey a wide variety of information almost instantly with the scan of a mobile device. In this case, the QR code contains information that, when scanned by the user mobile device 105, instructs the user mobile device 105 to visit a website provided and controlled by the ES provider 140. The user mobile device 105 is ultimately communicable with the website controlled by the ES telephony provider 140 via a radio basestation 108 coupled with IP network 115. The website, in turn, asks the mobile device 105 to retrieve and provide its own location data which may then be sent to the registration module 145 where it may then be populated into the ES provider endpoint database 150. Once the location data has been stored in ES provider endpoint database 150, the registration module 145 may authorize the telephony endpoint's session request permitting it to initiate a telephony session. The process is further described with respect to the message flow diagram in FIG. 3 and flowcharts in FIGS. 5-6 below.

Figure 2:
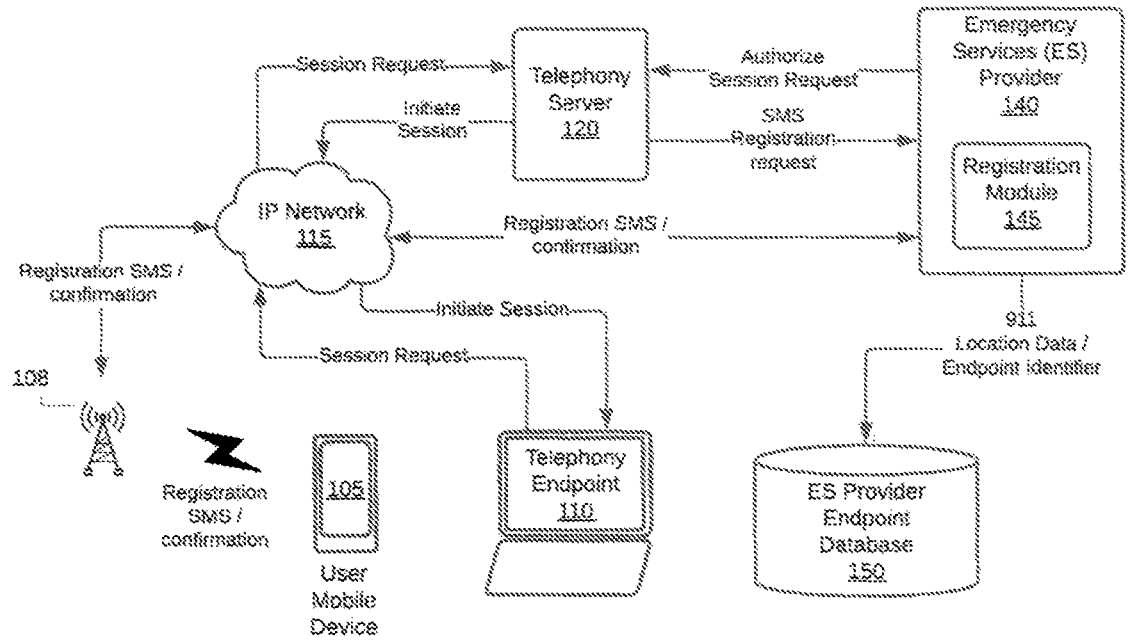
FIG. 2 illustrates a second network architecture for registering a non-traditional VoIP endpoint for emergency services according to an embodiment.

FIG. 2 a second network architecture 200 for registering a non-traditional VoIP endpoint for emergency services according to an embodiment. The second network architecture 200 illustrates a user mobile device 105 such as a smartphone and a non-traditional VoIP telephony endpoint 110 such as a laptop executing VoIP capable software. The user mobile device 105 is ultimately communicable with ES telephony provider 140 via a radio basestation 108 coupled with IP network 115. The endpoint 110 is communicable with a telephony server 120 via an IP network 115 (e.g., the Internet). The telephony server 120 is further communicable with an emergency services ES telephony provider 140. The ES provider 140 maintains an ES provider endpoint database 150 comprising unique identifiers for each endpoint 110 as well as current location data for such endpoints 110. The aforementioned system elements are configured to work together to register the endpoint 110 within the ES provider endpoint database 150 so that if a 911 emergency call is initiated from the endpoint 110, it can be processed successfully by the ES provider 140.

In another embodiment, this goal may be achieved through use of an SMS registration message that is created by a registration module 145 within ES provider 40 and sent to user mobile device 105 in response to the telephony endpoint 110 requesting a session. In this embodiment, the SMS registration message contains a link that, when executed by the user on user mobile device 105, causes the user mobile device 105 to visit a website provided and controlled by the ES provider 140 that asks the user mobile device 105 to retrieve its own location data that may be forwarded to the registration module 145 where it may then be populated into the ES provider endpoint database 150. Once the location data has been stored in ES provider endpoint database 150, the registration module 145 may authorize the telephony endpoint's session request permitting it to initiate a telephony session. The process is further described with respect to the message flow diagram in FIG. 4 and flowcharts in FIGS. 5 and 7 below.

FIG. 3 illustrates a first message flow for registering a non-traditional VoIP endpoint for emergency services according to an embodiment. In this embodiment, the telephony endpoint 110 sends a session request message 305 to the telephony server 120. The session request message 305 is a request to allow the telephony endpoint 110 to establish a session with the telephony server 120 such that the telephony endpoint can make or receive calls, join teleconferences, etc. The session request message may be automatically sent upon startup of the VoIP telephony software running on or accessed by the endpoint 110. Upon receipt of the session request message 305, telephony server 120 creates a registration request message 310 that it sends to the ES provider 140. The registration request message 310 instructs the ES provider 140 to initiate a process for registering the telephony endpoint 110 in the ES database 150. The registration request message 310 also includes a telephony endpoint identifier (i.e., SIP URI) so that the telephony endpoint 110 may be contacted by the ES provider 140. The registration request message 310 may be required to ensure that if the telephony endpoint 110 were to make a 911 call, the 911 call can be properly handled which includes contemporary location information.

In response to receiving the registration request message 310, ES provider 140 sends a QR code pop up 315 to telephony endpoint 110 that causes the QR code pop up 315 to be displayed on telephony endpoint 110. The user may then use their user mobile device 105 (e.g., smartphone) to scan 320 the QR code pop up 315. The information contained in the QR Code may include instructions for the user mobile device 105 navigate to a website 112 managed by the ES provider 140. The website 112 may then prompt the user of mobile device 105 for permission to access and retrieve its current GPS location data 325 and transmit it to a destination that is managed, accessed, and controlled by ES Provider 140. Thus, upon successful scanning 320 of the QR code by user mobile device 105, the location data 3325 of user mobile device 105 is sent to ES Provider 140. The location data 325 of the user mobile device 105 is then stored in the ES database 150. Because the mobile device 105 and the telephony endpoint 110 are both in possession of the user, the location of the user mobile device 105 may also be attributed to the location of the telephony endpoint 110.

The ES Provider 140 acknowledges 330 storing a telephony endpoint identifier (received with registration request 310) and location data 325 for the telephony endpoint 110 back to telephony server 120 in an authorize session request message 335. The telephony server 120, in turn, may then establish a session 340 to the telephony endpoint 110.

FIG. 4 illustrates a second message flow for registering a non-traditional VoIP endpoint for emergency services according to an embodiment. In this embodiment, the telephony endpoint 110 also sends a session request message 405 to the telephony server 120. Upon receipt of the session request message 405, telephony server 120 creates an SMS registration request message 410 that it sends to the ES provider 140. The SMS registration request message 410 instructs the ES provider 140 to initiate a process for registering the telephony endpoint 110 in the ES database 150. The SMS registration request message 410 also includes a user mobile device 105 telephone number so that the user mobile device 105 may be contacted via SMS by ES provider 140. The mobile telephone number has been pre-registered as being associated with the user of telephony endpoint 110. Upon receipt of the SMS registration request message 410, ES Provider 140 creates and sends a SMS registration link message 415 to user mobile device 105. The user of user mobile 105 may then click or open the link which may cause user mobile device 105 to open a browser and navigate to a website 112 managed by the ES provider 140. The website 112 may then prompt the user of mobile device 105 for permission to access and retrieve its current GPS location data 425 and transmit it to a destination that is managed, accessed, and controlled by ES Provider 140. The location data 425 of the user mobile device 105 is then stored in the ES database 150. Because the mobile device 105 and the telephony endpoint 110 are both in possession of the user, the location of the user mobile device 105 may also be attributed to the location of the telephony endpoint 110.

The ES Provider 140 acknowledges 430 storing a telephony endpoint identifier (received with SMS registration request 410) and location data 425 for the telephony endpoint 110 back to telephony server 120 in a registration complete message 435. The telephony server 120, in turn, may then establish a session 440 to the telephony endpoint 110.

FIG. 5 illustrates a first flowchart 500 for registering a non-traditional VoIP endpoint for emergency services according to an embodiment. This data flow may be representative of some or all of the operations executed by one or more logic, features, or devices described herein, such as any devices or systems described above with references to other figures herein. The flowchart 500 may comprise one or more steps or processes involved in registering an IP endpoint in a communications network as described elsewhere herein. The embodiments, however, are not limited to the number, type, order or arrangement of steps shown in FIG. 5.

The registration process for a non-traditional VoIP telephony endpoint 110 begins when the telephony endpoint 110 attempts to initiate a telecommunication session with a telephony server 120 at step 505. The term initiate may refer to the act of launching a software application (e.g., a softphone client) that is capable of telecommunications via telephony server 120. The software application may reside locally on telephony endpoint 110 or on a server (remote access) accessible via an Internet connection. Upon launch of such an application, the first step may be to ensure the telephony endpoint 110 is properly registered with an ES provider 140 so that potential emergency service (e.g., 911) calls may be properly handled. Telephony server 120 may then notify ES provider that telephony endpoint 110 has launched their softphone client application at step 510 necessitating an address registration process for emergency calling. The notification may include IP address or SIP URI information allowing the ES Provider to push a communication to the telephony endpoint 110. The notification may further include a telephone number corresponding to a mobile user device 105 known to be associated with the user of telephony endpoint 110. ES Provider 140 may then send a request to provide location data for the telephony endpoint 110 at step 515. In one embodiment, this request may involve the sending of a QR code back to telephony endpoint 110 as will be described in more detail with respect to FIG. 6. In another embodiment, this request may involve sending an SMS registration message to the user mobile device 105 associated with the user of the telephony endpoint 110 as will be described in more detail with respect to FIG. 7. The process labeled "A" 520 represents the implementations of the aforementioned embodiments described below in FIGS. 6 and 7.

Upon completion of the process labeled "A" 520, the ES Provider 140 receives location information from user mobile device 105 in step 525. The location information may be in the form of GPS coordinates (e.g., lat/long) that may be translated by the ES Provider 140 into address data and the address data may then be verified and formatted into a format acceptable to and usable by a PSAP. This translation may utilize one or more databases known in the industry that are capable of converting and/or synchronizing GPS data to address data (or nearest address data). Some of these databases may include the Graphical Information System (GIS) database, the Master Street Address Guide (MSAG) database, and the Automatic Location Information (ALI) database.

For instance, a registration module 145 within ES Provider 140 may be responsible for communicating with the telephony server 120, telephony endpoint 110, and user mobile device 105. The registration module 145 may receive the user mobile device 105 location data based on a response to a QR Code scan (FIG. 6) or activation of an SMS registration link (FIG. 7). ES Provider 140 may then validate the location information, store it, and acknowledge its receipt back to telephony server 120 at step 535. For example, registration module 145 may utilize the Master Street Address Guide (MSAG), a database that houses all streets and addresses within their associated postal range for emergency service purposes to verify and format the location information. The MSAG Address Directory for any address-range belongs to a state or municipal authority who are responsible for updating the MSAG Directory and making it available for use. An ES Provider 140 may utilize the MSAG database when it comes to providing 911 access services. The address data may be geo-coded to assign an X/Y coordinate for each record, providing confirmation upon successful validation. The geo-coded address in the MSAG compliant format for the jurisdiction in question in the ES Provider database 150. Each telephony endpoint's current address is then immediately available to respond to PSAP queries. Registration module 145 may alternatively utilize the GIS or ALI databases to verify and convert location data to address data.

In an alternative embodiment, the ES Provider 140 may leave the GPS data in its coordinate form if the PSAPs that may receive such data can process it in its coordinate form. This data may then be stored in an ES database 150 along with a telephony endpoint 110 identifier that may be used to create a telecommunication session between a PSAP and the telephony endpoint 110. The telephony endpoint 110 identifier may be a SIP URI, an IP address, a device ID or combination thereof sufficient to allow the ES Provider 140 to establish a VoIP telecommunication session directly with the telephony endpoint whether or not such telephony endpoint 110 is associated with a telephone number.

Upon successful updating of the ES database 150 with the verified and PSAP usable location/endpoint identifier information, ES Provider 140 sends an acknowledgement message to telephony server 120. The acknowledgement message informs the telephony server 120 that the telephony endpoint 110 registration process has successfully completed. Telephony server 120 may then authorize the telephony session request and establish the permissions necessary for the telephony endpoint 110 to make and receive interconnected VoIP calls at step 535. Thereafter, the telephony endpoint 110, which may be a laptop device or a tablet computer, can engage in inter-connected VoIP telecommunications with the required ability to make 911 calls that include current address data. Inter-connected VoIP refers to telecommunications that can include endpoints connected to VoIP connections as well as endpoints connected to other telecommunication networks like the public switched telephone network (PSTN).

Because the telephony endpoint 110 is nomadic meaning it can change locations rather easily, there exists the possibility the address data may change which should be updated in the ES Provider database 150. In one embodiment, telephony server 120 may monitor its connection with the telephony endpoint 110. If a change in connectivity is detected such as a change in the IP address with which it is exchanging VoIP traffic data, the telephony server may initiate an "update location" process. This may entail having the telephony server 120 prompt the telephony endpoint 110 if their location has changed. If the user response indicates no change in address, telephony server 120 goes back to monitoring for subsequent connectivity changes. If the user response is indicative of a change in location, the ES Provider 140 may be informed by telephony server 120 that a new registration process is needed.

FIG. 6 illustrates a second flowchart 600 for registering a non-traditional VoIP endpoint for emergency services according to an embodiment. This data flow may be representative of some or all of the operations executed by one or more logic, features, or devices described herein, such as any devices or systems described above with references to other figures herein. The flowchart 600 may comprise one or more steps or processes involved in registering an IP endpoint in a communications network as described elsewhere herein. The embodiments, however, are not limited to the number, type, order or arrangement of steps shown in FIG. 6.

In this embodiment, ES Provider 140 has just received (in step 510) a registration request from a telephony server 120 on behalf of a telephony endpoint 110. The ES Provider 140 may then generate and push a QR code to the telephony endpoint 110 in step 610 using the IP address or SIP URI of the telephony endpoint 110. The QR code may comprise instructions on how to fetch and return GPS location data of the device that scans the QR code. In addition, the QR code may contain information it has already received about the telephony endpoint 110 in the initial registration request message. The QR code may be presented on the display of the telephony endpoint 110. A user mobile device 105 may then be used to scan the QR code in step 620. The process takes advantage of the co-location of the telephony endpoint 110 and the user mobile device 105 to infer that the location of the user mobile device 105 is the same as the location of the telephony endpoint 110. Thus, when the user mobile device 105 scans the QR code in step 620, the user mobile device 105 may open a browser and navigate to a website identified in the QR code in step 630. The user of mobile device 105 may then be prompted to authorize the retrieval of its current location data which may be in the form of GPS coordinate data in step 640. This location data along with the telephony endpoint 110 identification information may be returned to the ES Provider 140 in step 650. Processing and control for the remaining steps of the registration process are returned to and described in FIG. 5 above.

FIG. 7 illustrates a third flowchart 700 for registering a non-traditional VoIP endpoint for emergency services according to an embodiment. This data flow may be representative of some or all of the operations executed by one or more logic, features, or devices described herein, such as any devices or systems described above with references to other figures herein. The flowchart 700 may comprise one or more steps or processes involved in registering an IP endpoint in a communications network as described elsewhere herein. The embodiments, however, are not limited to the number, type, order or arrangement of steps shown in FIG. 7.

In this embodiment, ES Provider 140 has just received a registration request from a telephony server 120 on behalf of a telephony endpoint 110 in step 710. The ES Provider 140 may then generate and push an SMS registration link to the user mobile device 105 in step 720. The mobile phone number for user mobile device 105 may be included in the registration request sent from telephony server 120. Telephony server 120 may maintain a table associating telephony endpoint 110 with a mobile phone number assigned to the telephony endpoint 110. This information may have been pre-determined when the telephony server 120 set up an account for the telephony endpoint 110.

The SMS registration link, when executed, may contain instructions to fetch and return GPS location data of the user mobile device 105. The ES Provider 140 may have already received the telephone number for the user mobile device 105 in the initial registration request message. The process takes advantage of the co-location of the telephony endpoint 110 and the user mobile device 105 to infer that the location of the user mobile device 105 is the same as the location of the telephony endpoint 110. The user of the user mobile device 105 may then decide whether to execute/follow the link received in the SMS message also in step 720. If the user executes the link received in the SMS message, the mobile device 105 may open a browser and navigate to a website identified in the SMS message. The user of mobile device 105 may then be prompted to authorize, in step 730, the retrieval of its current location data which may be in the form of GPS coordinate data.

If user mobile device 105 is authorized to retrieve its current location data, the location data along with telephony endpoint identification information may be returned to the ES Provider 140 in step 740. If the user opts not to authorize location retrieval, the registration process is terminated and no telecommunication session will be authorized in step 750. Processing and control for the remaining steps of the registration process are returned to and described in FIG. 5 above.

Figure 8:
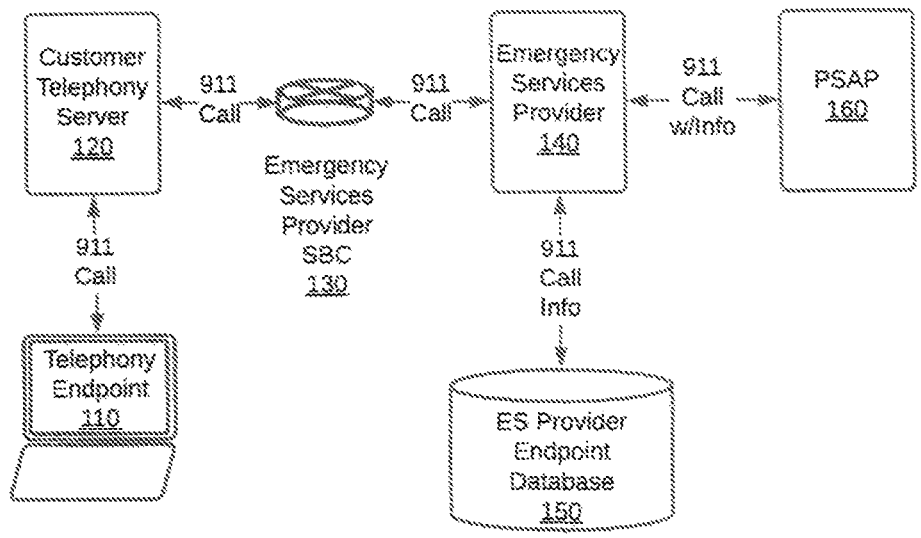
FIG. 8 illustrates a typical network architecture for connecting a non-traditional VoIP endpoint with a public service answering point (PSAP).

FIG. 8 illustrates a typical network architecture 800 for connecting a non-traditional VoIP endpoint 110 with a public service answering point (PSAP) 160. Once the registration process described in FIGS. 3-7 has been completed, telephony endpoint 110 can make an emergency (e.g., 911) and it will be handled as would any other 911 call from a telephony endpoint. For instance, the telephony endpoint dials 911 and the telephony server 120 immediately recognizes it as an emergency call and routes it, along with a telephony endpoint identifier, to the ES Provider 140 via an ES Provider session border controller (SBC) 130. The ES Provider 140 dips its ES Provider database 150 to obtain the location data associated with the telephony endpoint making the call. Once the location data is retrieved, the ES Provider 140 determines the proper PSAP 160 to which to route the call based on the location information. The ES Provider then routes the call and any other required data (e.g., location data and callback data) to that PSAP 160 and establishes a media connection between the telephony endpoint 110 and PSAP 160.

Figure 9:
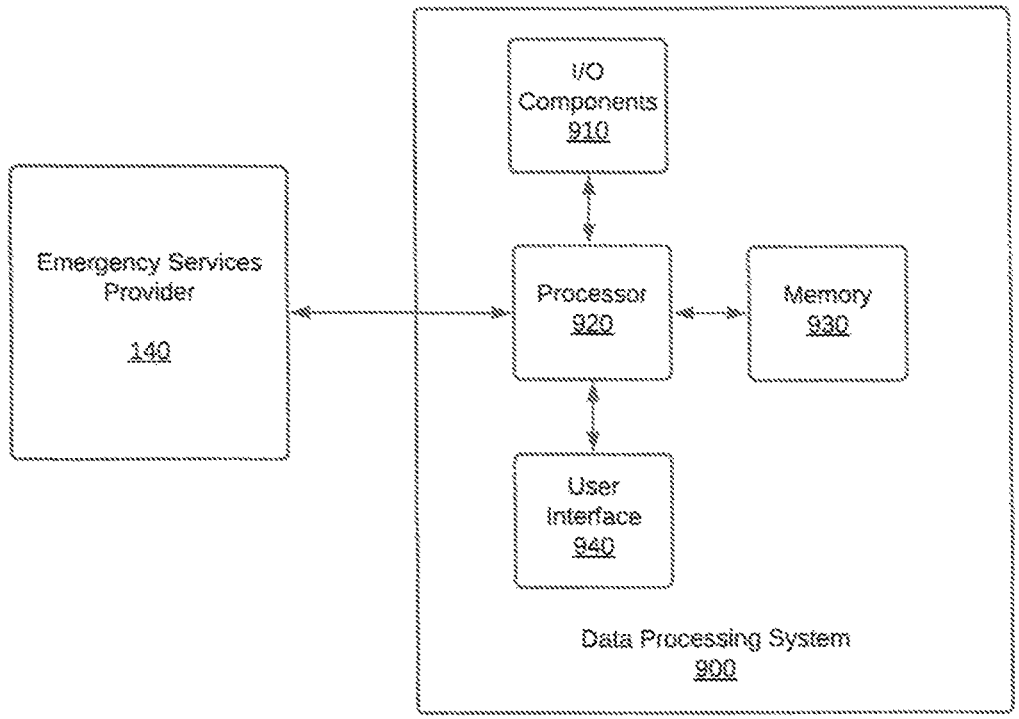
FIG. 9 illustrates an example of a computer based data processing system.

FIG. 9 illustrates an example of a computer based data processing system 900 suitable for use with any of the examples described above. Although the example data processing system 900 is shown as in communication with an ES provider 140 in accordance with embodiments of the present inventive concept, the data processing system 900 may also be part of the ES provider 140 without departing from the scope of the present inventive concept. In some examples, the data processing system 900 can be any suitable computing device for performing operations according to the embodiments discussed herein described herein.

As illustrated, the data processing system 900 includes a processor 920 communicatively coupled to I/O components 910, a user interface 940 and a memory 930. The processor 920 can include one or more commercially available processors, embedded processors, secure processors, microprocessors, dual microprocessors, multi-core processors, other multi-processor architectures, another suitable processing device, or any combination of these. The memory 930, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 920.

I/O components 910 may be used to facilitate wired or wireless connections to devices such as one or more displays, game controllers, keyboards, mice, joysticks, cameras, buttons, speakers, microphones and/or other hardware used to input or output data. Memory 930 represents non-volatile storages such as magnetic, optical, or other storage media included in the data processing system and/or coupled to processor 920.

The user interface 940 may include, for example, a keyboard, keypad, touchpad, voice activation circuit, display or the like and the processor 920 may execute program code or instructions stored in memory 930.

It should be appreciated that data processing system 900 may also include additional processors, additional storage, and a computer-readable medium (not shown). The processor(s) 920 may execute additional computer-executable program instructions stored in memory 930. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method executable by a server hosted by an emergency services provider server, the method comprising:
receiving a location registration request, via a telephony server responding to a non-emergency telecommunication session establishment request from a telephony endpoint, the request including telephony endpoint identification information and a mobile device telephone number;
determining that location data for the telephony endpoint is not registered with the emergency services provider server;

sending a short message service (SMS) message to the mobile device telephone number, the SMS message including an executable registration link that when executed on a mobile device receiving the SMS message causes the mobile device to retrieve location data of the mobile device;

receiving the location data of the mobile device;

registering, for purposes of subsequent emergency calling, the location data of the mobile device as the location data for the telephony endpoint with the emergency services provider server; and authorizing the telephony endpoint for the non-emergency telecommunication session only if the telephony endpoint has a location registered with the emergency services provider server.

2. The method of claim 1, wherein the location data comprises global data positioning (GPS) coordinates, the method further comprising:

converting the GPS coordinates to an address;

verifying the address is valid; and storing the verified address as the location data of the telephony endpoint.

3. The method of claim 2, wherein the location data comprises global data positioning (GPS) coordinates, the method further comprising:

storing the GPS coordinates as the location data of the telephony endpoint.

4. The method of claim 2, wherein optically scanning the QR code or bar code further causes the mobile device to communicate the location data to the emergency services provider server.

5. A computing system hosted by an emergency services provider server, comprising:

memory; and one or more processors coupled to the memory and configured to:

receive a location registration request, via a telephony server responding to a non-emergency telecommunication session establishment request from a telephony endpoint, the request including telephony endpoint identification information and a mobile device telephone number;

determine that location data for the telephony endpoint is not registered with the emergency services provider server;

send a short message service (SMS) message to the mobile device telephone number, the SMS message including an executable registration link that when executed on a mobile device receiving the SMS message causes the mobile device to retrieve location data of the mobile device;

receive the location data of the mobile device;

register, for purposes of subsequent emergency calling, the location data of the mobile device as the location data for the telephony endpoint with the emergency services provider server; and authorize the telephony endpoint for the non-emergency telecommunication session only if the telephony endpoint has a location registered with the emergency services provider server.

6. The computing system of claim 5, wherein the location data comprises global data positioning (GPS) coordinates, the one or more processors further configured to:

convert the GPS coordinates to an address;

verify the address is valid; and store the verified address as the location data of the telephony endpoint.

7. The computing system of claim 5, wherein the location data comprises global data positioning (GPS) coordinates, the one or more processors further configured to:

store the GPS coordinates as the location data of the telephony endpoint.

8. The computing system of claim 5, wherein optically scanning the QR code or bar code further causes the mobile device to communicate the location data to the emergency services provider server.

9. A non-transitory computer readable media comprising computer-executable instructions that, when executed by a computing system hosted by an emergency services provider server, cause the computing system to:

receive a location registration request, via a telephony server responding to a non-emergency telecommunication session establishment request from a telephony endpoint, the request including telephony endpoint identification information and a mobile device telephone number;

determine that location data for the telephony endpoint is not registered with the emergency services provider server;

send a short message service (SMS) message to the mobile device telephone number, the SMS message including an executable registration link that when executed on a mobile device receiving the SMS message causes the mobile device to retrieve location data of the mobile device;

receive the location data of the mobile device;

register, for purposes of subsequent emergency calling, the location data of the mobile device as the location data for the telephony endpoint with the emergency services provider server; and authorize the telephony endpoint for the non-emergency telecommunication session only if the telephony endpoint has a location registered with the emergency services provider server.

10. The non-transitory computer readable media of claim 9, wherein the location data comprises global data positioning (GPS) coordinates.

11. The non-transitory computer readable media of claim 10, comprising computer-executable instructions that, when executed by a computing system hosted by an emergency services provider server, cause the computing system to:

convert the GPS coordinates to an address;

verify the address is valid; and store the verified address as the location data of the telephony endpoint.

12. The non-transitory computer readable media of claim 10, comprising computer-executable instructions that, when executed by a computing system hosted by an emergency services provider server, cause the computing system to:

store the GPS coordinates as the location data of the telephony endpoint.

13. The non-transitory computer readable media of claim 9, wherein optically scanning the QR code or bar code further causes the mobile device to communicate the location data to the emergency services provider server.

* * * * *